United States Patent [19]

Cann, Jr.

[11] Patent Number: 4,480,861
[45] Date of Patent: Nov. 6, 1984

[54] PIPE JOINT AND APPARATUS THEREFOR

[75] Inventor: Frank E. Cann, Jr., Mecklenburg County, N.C.

[73] Assignee: Columbus Standard, Inc., Columbus, Ga.

[21] Appl. No.: 341,916

[22] Filed: Jan. 25, 1982

Related U.S. Application Data

[63] Continuation-in-part of Ser. No. 235,554, Feb. 18, 1981, abandoned.

[51] Int. Cl.³ .............................................. F16L 25/00
[52] U.S. Cl. .............................. 285/334.2; 285/334.3; 285/334.4; 285/368; 285/414
[58] Field of Search ............... 285/368, 412, 414, 341, 285/404, 334.4, 334.2, 334.3, 383, 177, 369

[56] References Cited

U.S. PATENT DOCUMENTS

| | | | |
|---|---|---|---|
| 1,821,865 | 9/1931 | Wilson | 285/334.2 |
| 2,417,536 | 3/1947 | Wurzburger | 285/341 |
| 2,531,922 | 11/1950 | Seamark | 285/383 X |
| 2,613,959 | 10/1952 | Richardson | 285/341 |
| 2,898,000 | 8/1959 | Hanny | 277/167.5 |
| 3,333,872 | 8/1967 | Crawford et al. | 285/404 X |
| 3,761,114 | 9/1973 | Blakeley | 285/368 |

FOREIGN PATENT DOCUMENTS

| | | | |
|---|---|---|---|
| 556079 | 2/1960 | Belgium | 285/177 |
| 651118 | 10/1982 | Canada | 285/368 |
| 2518898 | 11/1976 | Fed. Rep. of Germany | 285/368 |

Primary Examiner—Dave W. Arola
Attorney, Agent, or Firm—Richards, Shefte & Pinckney

[57] ABSTRACT

Apparatus for forming a sealed joint between juxtaposed, axially aligned pipe ends includes a pair of annular flange members slidable in facing relation on the pipe ends and having tapered annular interior surfaces converging outwardly of a central axis for forming an annular recess about the pipe ends. A resilient annular sealing gasket generally compatibly shaped with the recess is provided for disposition therewithin about the pipe ends. The gasket has a pair of tapered annular exterior surfaces which converge outwardly when uncompressed at slightly greater respective angles than the tapered interior surfaces of the flange members for respective sealing engagement thereby. A bolt arrangement draws the flange members axially together to compressibly engage the tapered exterior gasket surfaces between the tapered interior flange surfaces, thereby to compress the gasket against and between the pipe ends to seal them. Strikingly unexpectedly increased joint strength is provided over conventional joint-forming apparatus not having the feature of the present invention of contrasting tapers in the gasket and flange members.

16 Claims, 4 Drawing Figures

PIPE JOINT AND APPARATUS THEREFOR

CROSS-REFERENCED TO RELATED APPLICATIONS

This is a continuation-in-part of co-pending U.S. patent application Ser. No. 235,554, filed Feb. 18, 1981, for PIPE JOINT AND APPARATUS THEREFOR, now abandoned.

BACKGROUND OF THE INVENTION

The present invention relates to apparatus for forming a sealed joint between juxtaposed ends of two axially aligned pipes and particularly to apparatus of such type adapted for use with a sealing gasket in forming such a joint.

Broadly defined for purposes of herein describing the present invention, a pipe joint of the form to which the present invention is directed is one in which the ends of two pipes are sealably joined by apparatus disposed about each pipe end and acting to compress therebetween a resilient annular sealing gasket. Characteristically, apparatus for forming joints of this form comprise annular flange members adapted to be disposed in facing relationship about respective ones of the pipe ends with a sealing gasket therebetween and to be tightly joined as by a bolting arrangement or the like to seal the two pipe ends. Several types of such apparatus are in conventional use. One type of apparatus provides flange members having central threaded holes for threaded joinder about the respective pipe ends. Another conventional apparatus for forming such joints provides flange members having unthreaded central openings adapted for sliding disposition about and welding to the respective pipe ends. With each of these types of joint forming apparatus, a resilient sealing gasket ring or the like is utilized between the flange members. A third type of apparatus for forming such joints utilizes a pair of annular flange members relatively tightly slidable on the pipe ends to be joined, the two flanges being adapted to cooperatively define an annular recess at the pipe ends in which is received a compatibly shaped annular sealing gasket and utilizing a bolt arrangement or the like to draw the flanges axially together to compress the gasket therebetween and against the pipe ends. An example of this type of apparatus and a pipe joint formed therewith is disclosed in Canadian Pat. No. 651,118, issued Oct. 30, 1962, to Robert H. Edmonds.

Pipe joints of the above described types are relatively tight, allow considerable deflection and are relatively simple and inexpensive to install, especially joints formed with the latter above-identified type of apparatus. As a result, they are used effectively in pipelines in gas and water conveying systems. However, as those skilled in the art are aware, pipes of a variety of different materials, e.g., cast iron and ductile iron, are conventionally utilized in such systems and have different outer diametric dimensions for pipes of the same inner diameter size because of the different wall thickness required for different materials. Therefore, with any of the above three types of conventional joint-forming apparatus, differently sized flange members must be utilized for each different type and size pipe in order to avoid undesirable gaps between the flange and the pipe ends, which would render welding and threading connection impractical. Accordingly, a considerable inventory of differing flange members must normally be maintained. Moreover, with particular regard to the third above-identified type of joint-forming apparatus, it will be understood that the two pipes in the joint formed between the ends thereof are held together by the gripping force of the sealing gasket exerted against the gasket by the flanges utilized in combination with set screws extending generally radially through the flanges into engagement with the surface of the pipe ends and, therefore, such joints would be susceptible to failure under high operating pressures were a single size flange used with pipes of different wall thickness that would result in gaps in some instances that would make it difficult to form an effectively strong joint that would withstand high pressures. In this type of prior apparatus, it should also be noted that the set screws have no effect upon the gripping force exerted through the gasket directly at the pipe ends.

In contrast, the present invention provides a new and improved pipe joint and apparatus therefor of the third above-identified type specially adapted to exert significantly increased gripping force through the gasket thereof directly radially inwardly against the pipe ends joined and sealed thereby, the joint-forming apparatus being further adapted for use with pipes of differing materials and outer diameters.

SUMMARY OF THE INVENTION

The apparatus of the present invention basically provides for forming a sealed joint between the juxtaposed ends of two axially-aligned pipes. Briefly described, the apparatus comprises a pair of annular flange members slidable in cooperative facing relationship on the pipe ends and adapted to form therebetween an annular recess about the pipe end, a resilient annular sealing gasket adapted for surrounding and overlying the pipe ends and generally compatibly shaped with the recess for compressible disposition therewithin, and a bolt arrangement or the like for drawing the flange members axially together to compress the gasket therebetween. The flange members have respective tapered annular interior surfaces cooperatively converging outwardly in the aforementioned facing relationship with respect to a central axis to form the annular recess about the pipe ends. The gasket has a pair of tapered annular exterior surfaces which converge outwardly for respective sealing engagement by the annular interior surfaces of the flange members. According to the present invention, the tapered annular interior surfaces of the flange members are tapered in the aforesaid facing relationship at slightly smaller respective angles with respect to the central axis, preferably approximately twenty-three degrees, than the tapered annular exterior surfaces of the gasket when it is uncompressed, which surfaces are preferably angled with respect to the central axis at approximately twenty-eight degrees. In this manner, the drawing arrangement acts, when the gasket is disposed within the recess at the pipe ends, to cause the tapered annular interior surfaces of the flange members to engage the tapered annular exterior surfaces of the gasket and to compress the gasket against and between the pipe ends to sealably join them. As hereinafter more fully described, the above-described apparatus of the present invention facilitates the construction of pipe joints of the afore-described type having strikingly unexpectedly greater compressive gripping and holding power than conventional joints lacking the improved features of the present invention.

According the the preferred embodiment of the present invention, the uncompressed outermost dimensions of the tapered annular exterior surfaces of the gasket are greater than the corresponding dimensions of the tapered annular interior surfaces of the flange members to provide a tight fit of the gasket in the recess. It is additionally preferred that the flange members be provided with supplementary attaching means in the form of set screws extending inwardly from the flange members for movement in the aforesaid facing relationship toward and away from the pipe ends respectively into and out of clamping engagement therewith. The gasket of the apparatus of the present invention is also provided with an inwardly projecting annular flange for abutting disposition between the pipe ends.

The present invention also provides in one embodiment thereof for the joinder of the ends of pipes having differing outermost dimensions. In this embodiment, the flange members are of generally equivalent innermost dimensions slightly greater than the largest outermost dimension of the pipes and the gasket is provided with two annular pipe-engaging interior surfaces extending respectively from opposite sides of the inwardly-projecting flange and being of differing innermost dimensions respectively corresponding to the outermost dimensions of the pipes for respective engagement thereof.

DESCRIPTION OF THE PREFERRED EMBODIMENT

Figure 1:
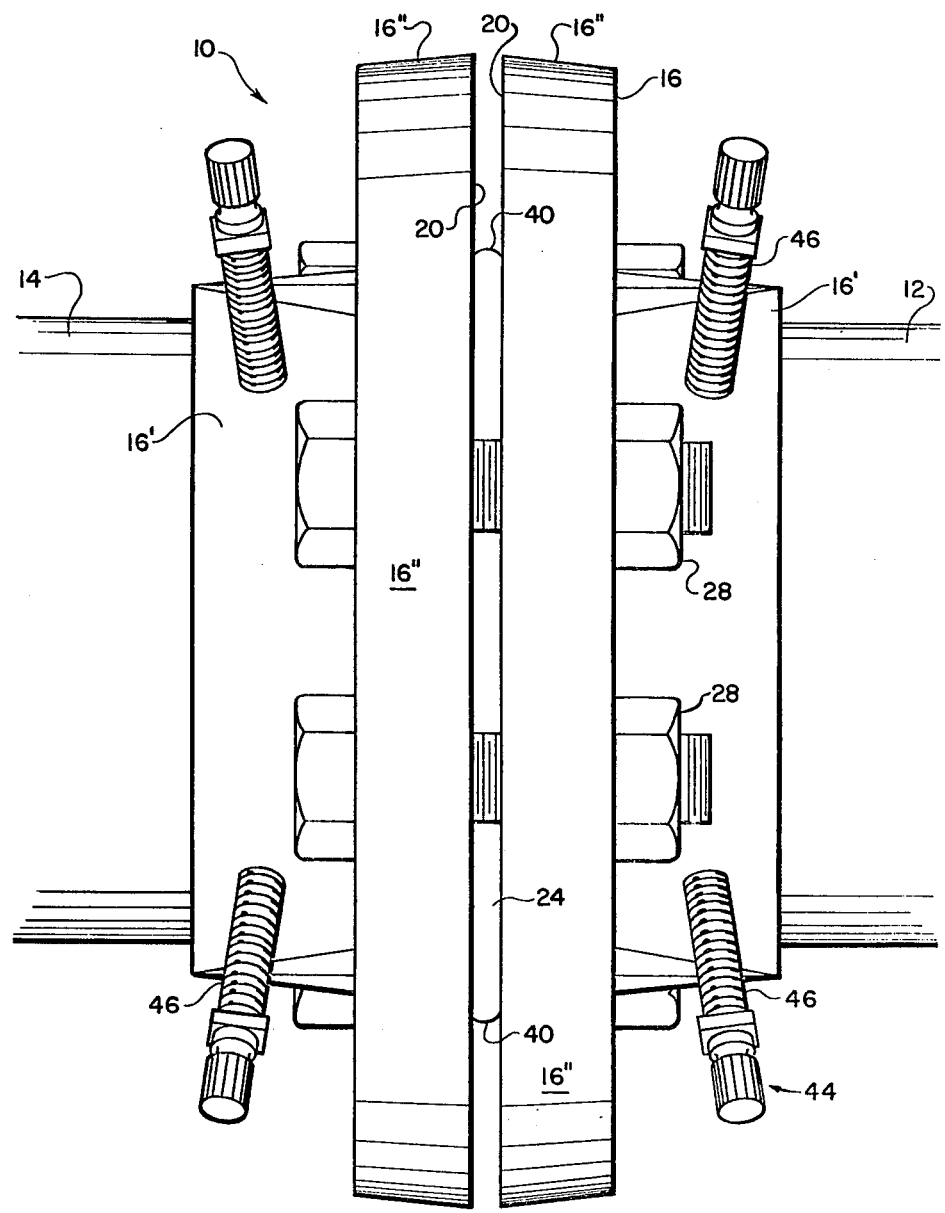
FIG. 1 is a side elevational view of one embodiment of the pipe joint of the present invention formed between the juxtaposed plain ends of two pipes utilizing the apparatus of the present invention.
Figure 2:
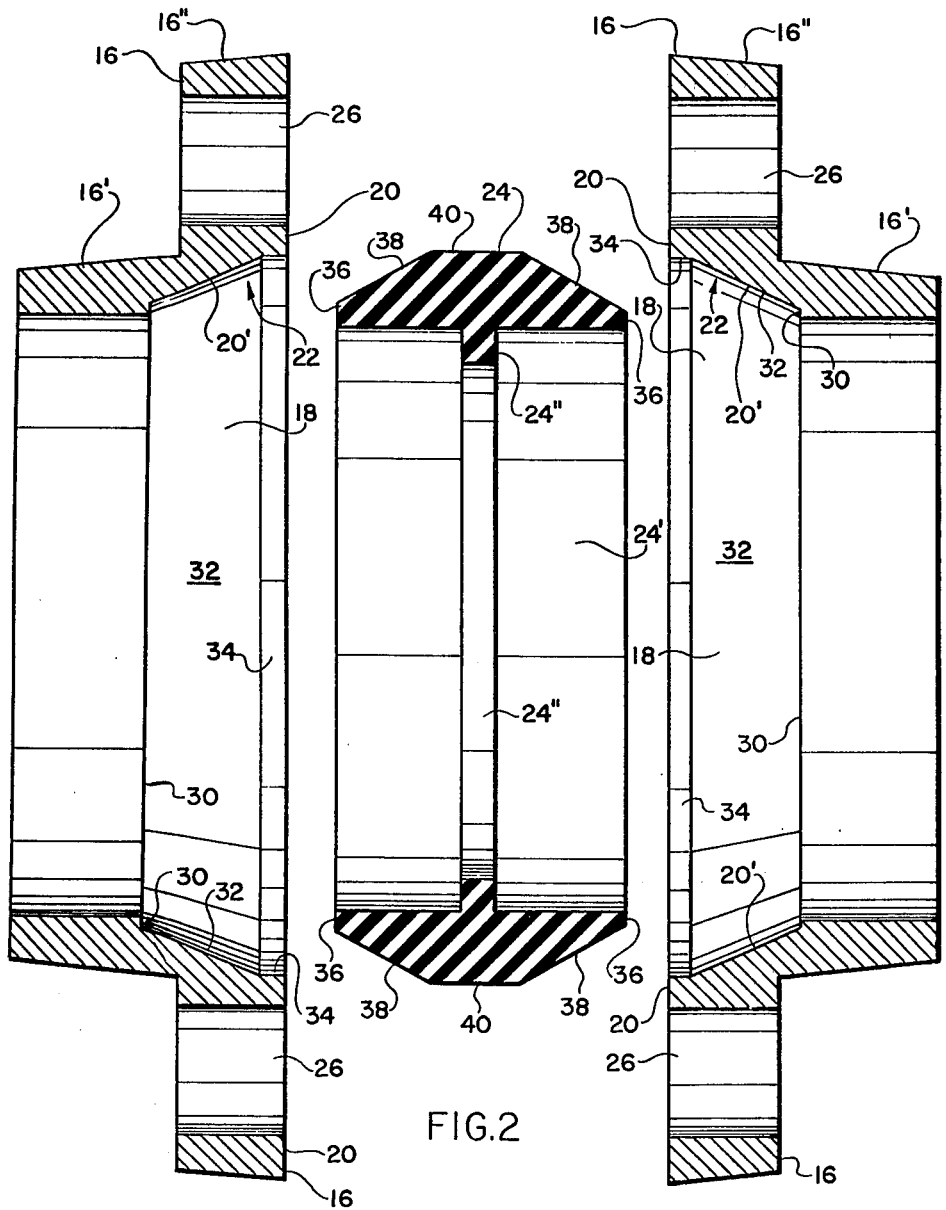
FIG. 2 is an exploded vertical cross-sectional view of the apparatus of the present invention utilized in the pipe joint of FIG. 1 taken along line 2—2 of FIG. 1.

Referring now to the accompanying drawings and initially to FIG. 1, the pipe joint 10 of the illustrated embodiment of the present invention sealably connects the respective juxtaposed ends 12',14' of two cylindrical pipes 12 and 14, each of which is of a conventional type having plain ends, i.e. without integral flanges or fittings affixed thereto. The apparatus of the present invention for forming the pipe joint 10 is best seen in FIG. 2 and includes a pair of annular flange members 16 each having a cylindrical portion 16' from one end of which outwardly extends an annular flange 16", the central opening 18 formed by the cylindrical portion of each flange member 16 permitting the sliding disposition of the two flange members 16 about respective ones of the pipe ends 12',14'. The flanged end of each flange member 16 forms a radially extending, annular flange face 20 taperingly profiled at 20' adjacent the central opening 18 such that the flange members 16 will cooperatively define between their respective flange faces 20 an annular recess 22 when they are disposed with their central openings 18 axially aligned and their flange faces 20 in facing relationship. The joint-forming apparatus of FIG. 2 also includes a resilient annular sealing gasket 24 having a cylindrical central opening 24' and thereby being adapted to be slip-fitted on the ends of 12',14' of the pipes 12,14 for surrounding and overlying the pipe ends 12',14' in their juxtaposed axially-aligned disposition, the gasket 24 also having an annular flange 24" which projects inwardly of the central opening 24' for abutting disposition between the pipe ends 12',14'. As will be seen in FIG. 2, the gasket 24 is of a size corresponding to the recess 22 and the outwardly facing surface of the gasket 24 is generally compatibly profiled with the profiled portions 20' of the flange faces 20 of the flange members 16 in their aforesaid facing relationship whereby the gasket 24 may be disposed between the flange members 16 in their facing disposition in the recess 22 formed thereby. The annular flange 16" of each flange member 16 is provided with a plurality of corresponding bores 26 extending therethrough substantially parallel with respect to the axis of its central opening 18, the joint-forming apparatus of FIG. 2 including a respective plurality of nut and bolt assemblies 28 for disposition through the bores 26 to permit the attachment of the flange members 16 in their facing disposition and the selective drawing thereof axially together. In this manner, the pipe joint 10 is assembled and sealably formed between the two pipe ends 12',14' by sliding each flange member 16 on a respective one of the pipe ends 12',14' with its flange face 20 facing the pipe end, axially aligning the two pipe ends 12',14' in close juxtaposed and slidably positioning the gasket 24 thereabout so that it surrounds and overlies the two pipe ends 12',14' with its annular flange 24' abutted on opposite sides thereof by the pipe ends 12',14', sliding the flange members 16 to the pipe ends 12', 14' to enclose the gasket 24 within the recess 22 of the flange members 16 and attaching and tightening the bolt arrangement 28 on the flanges 16" to draw the flange members 16 axially together to compress the gasket 24 against the pipe ends 12',14' to seal them.

The flange members 16 are further provided with a supplementary attaching arrangement 44 to provide the apparatus of the present invention with increased gripping and holding capability, this supplementary attaching arrangement 44 including a plurality of set screws 46 circumferentially arranged in the cylindrical portion 16' of each flange member 16" and threadably supported therein for movement in the aforesaid facing disposition of the flange members 16 toward and away from the pipe ends 12',14' respectively into and out of clamping engagement therewith. Following the assemblage of the pipe joint 10 as described above, the set screws 46 of the supplementary attaching arrangement 44 are progressively moved into such clamping engagement with the pipe ends 12',14'.

The construction of the pipe joint and the apparatus therefor thus far described hereinabove is conventional and it is in such a joint and apparatus that the improvement of the present invention is incorporated. As can be seen in FIG. 2, the profiled portion 20' of the flange face 20 of each flange 16 is conjunctively formed by a transverse annular wall surface 30 spaced inwardly from the flange face 20 and extending radially outwardly from the interior surface of the cylindrical portion 16' which forms the central opening 18, a tapered annular interior wall surface 32 which extends outwardly from the transverse wall surface 30 toward the flange face 20 and terminates at a small inward spacing therefrom, and an axially extending annular wall surface 34 extending between the tapered annular interior wall surface 32 and the flange face 20. The outwardly facing surface of the gasket 24 is similarly shaped, the gasket 24 including a radially extending annular wall surface 36 at each end side thereof, a pair of tapered annular exterior surfaces 38 extending convergingly outwardly from the radial wall surfaces 36, and an axial wall surface 40 extending between the two tapered annular exterior surfaces 38. As will be understood, the radial, tapered and axial wall surfaces 32,34,36 of the flange members 16 are thus adapted to compressively sealingly engage respectively the radial, tapered and axial wall surfaces 36,38,40 of the gasket 24 upon the tightening of the bolt arrangement 28 in the assemblage of the pipe joint 10 as described above, the tapered annular interior surfaces 32 of the flange members 16 effectively compressing the gasket 24 inwardly against the pipe ends 12′,14′ as the flange members 16 are drawn axially together.

In conventional apparatus for forming pipe joints of this general type, the respective profiled surfaces of the flange members and the gasket thereof are formed of substantially identical shapes and sizes to provide a tight fit of the gasket in the recess formed between the flange members, the respective tapered surfaces of the flange members and the gasket thereof accordingly being formed at substantially exactly the same angle with respect to the axial extent of the pipe joint formed therewith. However, contrary to this conventional practice and wisdom, it has been discovered that a substantially tighter fit of the gasket between the flange members and significantly increased gripping and holding capability are unexpectedly achieved in pipe joints of this type by forming the interior tapered surfaces of the flange members at a slightly smaller angle than the corresponding tapered outer surfaces of the gasket. Thus, as can best be seen in FIG. 2, the tapered annular interior surfaces 32 of the flange members 16 are tapered in their aforesaid facing relationship at slightly smaller respective angles with respect to the central axis thereof and the axial extent of the pipe joint 10 than are the tapered annular exterior surfaces 38 of the gasket 24 when it is uncompressed. Preferably, the angular differential between the tapered annular interior surface 32 of the flanges 16 and the respective tapered annular exterior surface 38 of the gasket 24 with which it is engaged in the pipe joint 10 is approximately five degrees (5°), the tapered annular exterior surfaces 38 of the gasket 24 each being tapered at approximately twenty-eight degrees (28°) with respect to the central axial extent of the pipe joint 10 and the tapered annular interior surfaces of the flange members 16 being tapered at about twenty-three degrees (23°) with respect thereto. The gasket 24 is additionally constructed with the uncompressed outer diametric dimensions of the tapered annular exterior surface 38 thereof slightly greater than the corresponding dimensions of the tapered annular interior surfaces 32 of the flange members 16 to provide the tightest possible fit of the gasket 24 in the recess 22 and to provide a pinching effect on the gasket 24 in the assembled joint 10.

Figure 3:
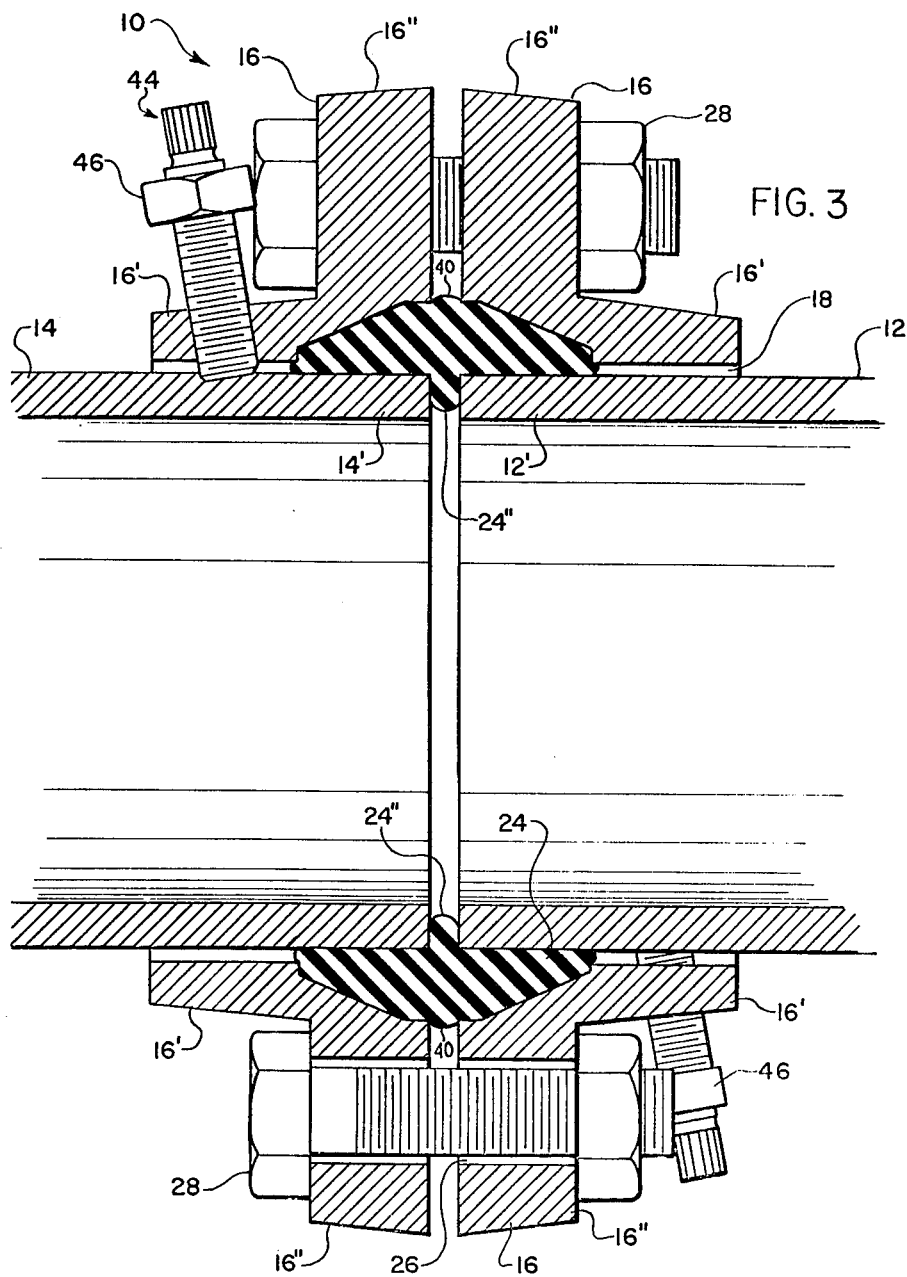
FIG. 3 is a vertical cross-sectional view of the pipe joint of FIG. 1 also taken along line 2—2 of FIG. 1.

In this manner, upon the tightening of the bolt arrangement in the assemblage of the pipe joint 10 to draw the flange members 16 axially together into compressing sealing engagement with the gasket 24, the tapered annular interior surfaces 32 of the flange members 16 are caused to initially engage the tapered annular exterior surfaces 38 of the gasket 24 at respective points thereon adjacent the opposite annular sides of the axial wall surface 40 of the gasket 24 and substantially directly radially outwardly of the respective pipe ends 12′,14′. The compressive forces thus exerted against the gasket 24 are thereby concentrated at such points rather than being equally exerted across the entirety of the tapered annular exterior gasket surfaces 38 as is produced in conventional pipe joints, such compressive forces being resultingly directed substantially more radially inwardly of the pipes 12,14 against the pipe ends 12′,14′ and considerably more closely to the pipe ends 12′,14′ than with conventional pipe joint forming apparatus, causing the gasket 24 to be compressed substantially directly against and between the pipe ends 12′,14′, as is illustrated in FIG. 3, to better seal such pipe ends. Accordingly, the pipe joint 10 of the present invention provides increased sealing strength under deflection thereof over conventional joints utilizing compatibly profiled gaskets and flange members. In preliminary comparative tests of a pipe system incorporating the pipe joint 10 of the present invention with a pipe system utilizing a conventional pipe joint of corresponding size, the pipe joint of the present invention was found to withstand without failure internal pressures of up to approximately twice the maximum internal pressure which the conventional system would satisfactorily withstand. Thus, the flange members and gasket of the apparatus of the present invention serve as an adapter to adapt pipes having plain ends for forming a flanged joint that results in a joint similar to a mechanical pipe joint.

In addition to the apparent advantages provided by the present invention, the improved joint strength realized with the present invention additionally now permits the use of the same flange member with pipes of differing sizes, types and materials. Conventionally, pipes are sized according to their internal diametric dimension. However, since differing materials conventionally used for pipe construction have correspondingly different tensile strength and deflective properties, pipes of differing materials having the same internal dimension often are formed with at least slightly differing wall thicknesses and, therefore, have differing outer diametric dimensions. With conventional joint-forming apparatus utilizing flange members adapted for welding or threaded joinder to the ends of pipes to be joined therewith, differing flange members must be utilized for different types of pipes having differing outer diametric dimensions in order to make the welded or threaded connection feasible. In other conventional apparatus utilizing flange members adapted for sliding disposition about pipe ends to be joined and constructed to form a recess and to receive therein and compress a compatibly shaped gasket, the diameter of the central openings of the flange members is formed only slightly larger than the outer diameter of the type and size of pipe with which it is to be used thereby to provide a relatively tight slip fit of the flange members thereon to accordingly enhance the gripping engagement of the pipe ends. Any significant spacing between the flange members and the pipe ends about which they are slip-fitted will substantially decrease the gripping power of the flange members on the pipe ends and greatly increase the chances of failure of the joint. Thus, pipes of differing materials having the same internal dimensions but differing external dimensions conventionally require different flanges and different gaskets, requiring the maintenance of a relatively large inventory of different flange members and gaskets. With the present invention, the increased gripping strength provided thereby permits the construction of the flange members for any given internal diameter of pipe with central openings in the flange members sufficiently large to facilitate the use of the flange members with substantiallly all pipes of such internal diameter. Thus, the flange members 16 of the present invention operate equally well to grip the ends of pipes 12,14 even with a spacing between the internal diameter of the central opening 18 of the flange member 16 and the outer diameter of the pipes 12,14, as can best be seen in FIG. 3. The flange members 16 are accordingly equally adaptable for use with other pipes having slightly greater outer diameters than the illustrated pipes 12,14. As will be understood, since the gasket in such an apparatus must tightly slip fit onto the pipe ends to be joined, differing gaskets will still normally be used, however, to adapt to the differing pipe thickness of differing pipes.

Figure 4:
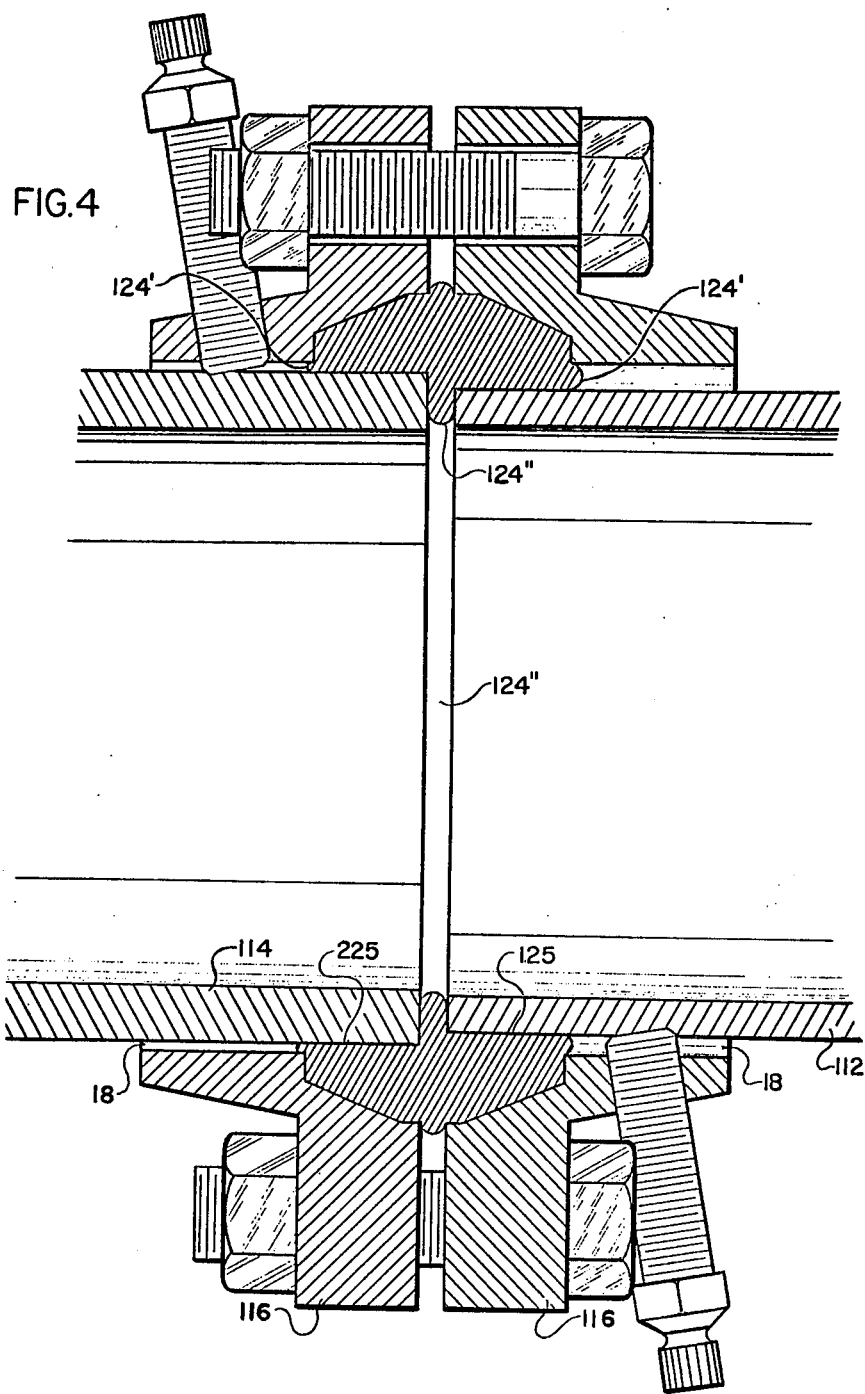
FIG. 4 is a vertical cross-sectional view similar to FIG. 3 of another embodiment of the pipe joint of the present invention formed between the juxtaposed plain ends of two pipes of differing outer diameters.

An example of this type of embodiment of the present invention for forming a pipe joint between the ends of two cylindrical pipes 112,114 of differing outer diameters is illustrated in FIG. 4 wherein the pipes 112 and 114 are of generally the same internal diametric dimensions but of relatively significantly differing outer diametric dimensions as, for example, would be the instance in joining a steel pipe with a ductile or cast iron pipe, conventional ductile and cast iron pipes of any given standard internal diametric size having a larger outer diameter than conventional steel pipes of the same standard internal diameter. According to the present invention, two identical flanges 116 of the above-described type are employed, each having a cylindrical opening 18 of a diametric dimension slightly greater than the outer diameter of the largest pipe 114. A specially-constructed gasket 124 is utilized with the flanges 116, the gasket 124 being in all respects of the same construction as above-described, except for the central opening 124' therethrough. To facilitate the adaptation of the gasket 124 to each of the pipes 112,114, the central opening 124' of the gasket 124 is of differing diametric dimensions on opposite sides of the inwardly-projecting flange 124", the differing dimensions respectively corresponding to the differing outermost diametric dimensions of the pipes 112,114, thereby forming two respective annular pipe-engaging interior surfaces 125,225. In this manner, the flanges 116 are adapted to be slidably positioned on respective ends of the pipes 112,114 and the gasket 124 is adapted to be fitted on the ends of the pipes 112,114 with the interior surfaces 125,225 of the gasket 124 respectively engaging the correspondingly dimensioned pipe 112,114 thereby to permit the assemblage of a pipe joint between the pipes 112,114 in the above-described manner.

The present invention has been described in detail above for purposes of illustration only and is not intended to be limited by this description or otherwise to exclude any variation or equivalent arrangement that would be apparent from, or reasonably suggested by the foregoing disclosure to the skill of the art.

I claim:

1. Apparatus for forming a sealed joint between juxtaposed ends of two axially aligned pipes, comprising:
   (a) a pair of annular flange members slidable in cooperative facing relationship on the pipe ends and having respective tapered annular interior surfaces cooperatively converging outwardly in said facing relationship with respect to a central axis for forming an annular recess about the pipe ends,
   (b) a resilient annular sealing gasket adapted for surrounding and overlying the pipe ends and generally compatibly shaped with said recess for compressible disposition therewithin, said gasket having a pair of tapered annular exterior surfaces converging outwardly for respective sealing engagement by said annular interior surfaces of said flange members, and
   (c) means for drawing said flange members axially together in said facing relationship for compressing said gasket between said flange members by compressibly engaging said tapered annular exterior surfaces of said gasket with said tapered annular interior surfaces of said flange members, said tapered annular interior surfaces of said flange members being tapered in said facing relationship at slightly smaller respective angles with respect to said central axis than said tapered annular exterior surfaces of said gasket when said gasket is uncompressed, whereby when said gasket is disposed within said recess at the pipe ends said drawing means causes said tapered annular interior surfaces of said flange members to engage and compressingly deform said tapered annular exterior surfaces of said gasket into full conforming engagement with said tapered annular interior surfaces of said flange members to compress said gasket against and between the pipe ends to seal the pipe ends.

2. An apparatus for forming a sealed joint between juxtaposed ends of two axially aligned pipes according to claim 1 and characterized further in that the uncompressed outermost dimensions of said tapered annular exterior surfaces of said gasket are greater than the corresponding dimensions of said tapered annular interior surfaces of said flange members.

3. An apparatus for forming a sealed joint between juxtaposed ends of two axially aligned pipes according to claim 1 and characterized further in that said tapered annular interior surfaces of said flange members are tapered at an angle approximately five degrees (5°) less with respect to said central axis than said tapered annular exterior surfaces of said gasket.

4. An apparatus for forming a sealed joint between juxtaposed ends of two axially aligned pipes according to claim 3 and characterized further in that said tapered annular exterior surfaces of said gasket are tapered at an angle of about twenty-eight degrees (28°) with respect to said central axis and said tapered annular interior surfaces of said flange members are tapered at an angle of about twenty-three degrees (23°) with respect to said central axis.

5. An apparatus for forming a sealed joint between juxtaposed ends of two axially aligned pipes according to claim 1 and characterized further by supplementary attaching means extending inwardly from said flange members for movement in said facing relationship toward and away from said pipe ends respectively into and out of clamping engagement therewith.

6. An apparatus for forming a sealed joint between juxtaposed ends of two axially aligned pipes according to claim 1 and characterized further in that said gasket includes an inwardly projecting annular flange for abutting disposition between said pipe ends.

7. An apparatus for forming a sealed joint between juxtaposed ends of two axially aligned pipes according to claim 6 and characterized further in that said pipes are of differing outermost dimensions, said gasket having two annular pipe-engaging interior surfaces extending respectively from opposite sides of said inwardly projecting annular flange, said two pipe engaging surfaces being of differing innermost dimensions respectively corresponding to said outermost dimensions of said pipes.

8. An apparatus for forming a sealed joint between juxtaposed ends of two axially aligned pipes according to claim 7 and characterized further in that said flange members are of generally equivalent innermost dimensions slightly greater than the largest outermost dimension of said pipes.

9. A pipe joint comprising an end of a first pipe, an end of a second pipe axially aligned in juxtaposed relation with said first pipe end, a pair of annular flange members slidably disposed in cooperative facing relation on said first and second pipe ends and having respective tapered annular interior surfaces cooperatively converging outwardly of said pipes forming an annular recess about said pipe ends, a resilient annular sealing gasket generally compatibly shaped with said recess and compressibly disposed surrounding and overlying said pipe ends within said recess, said gasket having a pair of tapered annular exterior surfaces converging outwardly in respective sealing engagement with said annular interior surfaces of said flange members, and means drawing said flange members axially together and compressing said gasket between said flange members by compressibly engaging said tapered annular exterior surfaces of said gasket with said tapered annular interior surfaces of said flange members, said tapered annular interior surfaces of said flange members being tapered at slightly smaller respective angles with respect to the axis of said pipes than said tapered annular exterior surfaces of said gasket when said gasket is uncompressed, whereby said drawing means causes said tapered annular interior surfaces of said flange members to engage and compressingly deform said tapered annular exterior surfaces of said gasket into full conforming engagement with said tapered annular interior surfaces of said flange members to compress said gasket against and between said pipe ends to seal said pipe ends.

10. A pipe joint according to claim 9 and characterized further in that said first and second pipes are of differing outermost dimensions, said gasket having an annular flange projecting inwardly between said pipe ends in abutting engagement therewith and two annular interior surfaces of differing innermost dimensions respectively corresponding to said outermost dimensions of said pipes respectively extending from opposite sides of said inwardly-projecting flange in compressed engagement respectively with said pipe ends of said correspondingly-dimensioned pipes.

11. A pipe joint according to claim 10 and characterized further in that said flange members are of generally equivalent innermost dimensions slightly greater than the largest outermost dimension of said pipes.

12. A pipe joint according to claim 9 and characterized further in that the uncompressed outermost dimensions of said tapered annular exterior surfaces of said gasket are greater than the corresponding dimensions of said tapered annular interior surfaces of said flange members.

13. A pipe joint according to claim 9 and characterized further in that said tapered annular interior surfaces of said flange members are tapered at an angle approximately five degrees (5°) less with respect to the axis of said pipes than said tapered annular exterior surfaces of said gasket.

14. A pipe joint according to claim 13 and characterized further in that said tapered annular exterior surfaces of said gasket are tapered at an angle of about twenty-eight degrees (28°) with respect to the axis of said pipes and said tapered annular interior surfaces of said flange members are tapered at an angle of about twenty-three degrees (23°) with respect to said central axis.

15. A pipe joint according to claim 9 and characterized further by supplementary attaching means extending inwardly from said flange members for movement toward and away from said pipe ends respectively into and out of clamping engagement therewith.

16. A pipe joint according to claim 9 and characterized further in that said gasket includes an inwardly projecting annular flange abuttingly disposed between said pipe ends.

* * * * *